United States Patent [19]

Barry

[11] 4,193,269
[45] Mar. 18, 1980

[54] APPARATUS FOR SUPPLYING A COOLING LIQUID TO A CONDENSER OF A REFRIGERATION UNIT

[75] Inventor: Vincent T. Barry, Camillus, N.Y.
[73] Assignee: Carrier Corporation, Syracuse, N.Y.
[21] Appl. No.: 933,339
[22] Filed: Aug. 14, 1978
[51] Int. Cl.² .............................................. F25B 39/04
[52] U.S. Cl. ....................................... 62/171; 62/184; 236/75; 307/252 B
[58] Field of Search ................. 62/171, 181, 305, 179, 62/91 V, 121, 184; 307/252 B; 236/75

[56] References Cited

U.S. PATENT DOCUMENTS

| | | |
|---|---|---|
| 2,278,242 | 3/1942 | Chapman . |
| 2,551,758 | 5/1951 | Newton .................................. 236/92 |
| 2,664,715 | 1/1954 | Borgerd . |
| 3,545,676 | 12/1970 | Barker .................................... 236/75 |
| 3,613,392 | 10/1971 | Tucci ...................................... 62/184 |
| 4,075,865 | 2/1978 | Wills ....................................... 62/183 |

*Primary Examiner*—William E. Wayner
*Attorney, Agent, or Firm*—J. Raymond Curtin; John S. Sensny

[57] ABSTRACT

An apparatus for supplying a cooling liquid to a condenser of a refrigeration unit. The apparatus comprises a conduit for passing the cooling liquid from a source thereof into thermal communication with the condenser, and a valve to regulate the flow of liquid through the conduit and having an open position allowing the liquid to flow through the conduit. The apparatus further comprises an electronic control for use with a source of an electronic signal, including an electronic switch having an open state in which the electronic signal does not pass through the switch, a closed state in which the electronic signal passes through the switch, and a trigger wherein, when an electronic signal having a predetermined magnitude passes to the trigger, the switch changes from the open state to the closed state. The electronic control also includes electronically actuated means positioned in series with the electronic switch for moving the valve to the open position, and a temperature responsive resistance element in thermal communication with refrigerant passing through the condenser and positioned in series with the trigger of the electronic switch for varying the magnitude of the electronic signal passing to the trigger in response to the temperature of the refrigerant passing through the condenser wherein the electronic switch changes from the open state to the closed state when the temperature of the refrigerant passing through the condenser reaches a predetermined magnitude.

4 Claims, 2 Drawing Figures

APPARATUS FOR SUPPLYING A COOLING LIQUID TO A CONDENSER OF A REFRIGERATION UNIT

BACKGROUND OF THE INVENTION

This invention relates generally to refrigeration units, and more specifically to apparatus for supplying a cooling liquid to a condenser of a refrigeration unit.

Normally, the air passing through an air cooled condenser of a refrigeration unit will absorb a sufficient amount of heat from the condenser and the refrigerant flowing therethrough to keep the refrigerant temperature within a desirable range, but occasionally the refrigerant will become overheated. For example, during an excessively hot day such as a day where the outside temperature is above 95° F., the cooling air directed over the condenser is at such an elevated temperature that the required transfer of the heat from the refrigerant to the ambient air does not take place. Even if the ambient temperature is not excessively high, it may well be that dust, film, and the like accumulate to such an extent on the exterior surfaces of the condenser that a layer of insulation is, in effect, formed between the refrigerant passing through the condenser and the the stream of cooling air in which the condenser is located, so that as a result the required heat transfer does not take place.

The result of such insufficient heat transfer is that the normal range of temperature of refrigerant flowing through the refrigeration unit cannot be maintained. Since the pressure of vaporous refrigerant is directly related to the refrigerant temperature, insufficient transfer of heat from the refrigerant to the cooling air also produces undesirably high refrigerant pressures. Operating with such temperatures and pressures, the refrigeration unit, specifically the compressor of the unit, must do more work to satisfy a refrigeration load, increasing the cost of satisfying that load. Further, the refrigeration unit may not be able to completely satisfy the refrigeration load, or the high temperatures and pressures may activate safety switches, rendering the compressor inoperable at a time when the refrigeration unit is most needed.

For this reason, refrigeration units having air cooled condensers are at times equipped with a water spray system wherein a water mist is sprayed over the exterior surfaces of the condenser when the refrigerant flowing through the condenser reaches an objectionably high temperature. Such condensers are generally referred to as evaporative condensers. The water sprayed over the condenser absorbs heat through the condenser surfaces from the refrigerant, helping to maintain the refrigerant temperature at tolerable levels. Typically, the water spray is not continuously needed to maintain the refrigerant temperature at an acceptable level. In order to minimize the amount of water sprayed over the condenser, thereby reducing the operating cost of the spray system, it is desirable to control the water spray so that the spray is employed when needed but left inactive when not needed. Commonly, this is done by sensing one or more of several factors such as the temperature or pressure of the refrigerant flowing through the condenser or the temperature of the ambient air and controlling the water spray in response to the sensed factor.

Prior art condenser spray controls are shown in U.S. Pat. Nos. 2,278,242; 2,551,758; 2,664,715; and 3,613,392. These references, along with U.S. Pat. No. 4,075,865 which is discussed below, appear to be the prior art known to applicant which is most relevant to the present disclosure. The first four of the above-listed patents disclose spray systems in which the control factor is sensed by mechanical elements, including various thermostats, diaphragms, springs, and bellows. As may be appreciated, such mechanical elements are often relatively difficult to manufacture and install, and many times have a comparitively short life span. In addition, mechanical elements may be frequently exposed to and detrimentally affected by factors such as bugs, dust, or dirt, causing the elements to be inaccurate or unreliable.

In accordance with the present invention, an electronic control senses the temperature of refrigerant flowing through an air cooled condenser and controls a water spray associated with the condenser in response to this temperature. Such a water spray control is relatively simple, more reliable, and less expensive than those developed heretofore. The control requires minimal skill in assembly and installation, and includes the inherent advantages such as accuracy and durability which electronic elements have over mechanical devices. By increasing the reliability, accuracy, and durability of the water spary control, the water spray is better able to assist the ambient air, when such assistance is needed, in maintaining the refrigerant within the desired temperature and pressure range and in preventing the development of overload conditions. This, in turn, increases the efficiency and life span of the refrigeration unit as a whole.

The use of an electronic control for a refrigeration unit is disclosed in the last of the above-cited references, U.S. Pat. No. 4,075,865. This patent, however, uses the control to govern the speed of a fan motor of an air cooled condenser to vary the amount of air passed over the condenser. Moreover, the electronic control disclosed in this latter patent is fairly complex, involving an operational amplifier, a light emitting diode, a photosensitive transistor, and a plurality of triacs. On the other hand, the electronic control of the present invention is for controlling a water spray system and is comparitively simple. In light of the above discussion and in view of the comments below, it is submitted that the above-listed references do not disclose or suggest the apparatus or method disclosed herein.

SUMMARY OF THE INVENTION

An object of this invention is to improve refrigeration units.

Another object of the present invention is to improve evaporative condensers.

A further object of this invention is to improve systems for spraying water over the condenser of a refrigeration unit.

A still further object of the present invention is to control the water spray associated with an evaporative condenser in a relatively simple, reliable and inexpensive manner.

Another object of the present invention is to electronically control the spray of water over the exterior surfaces of a condenser of a refrigeration unit in response to the temperature of a refrigerant flowing through the condenser.

These and other objectives are attained with apparatus for supplying a cooling liquid to a condenser of a refrigeration unit. The apparatus comprises a conduit for passing the cooling liquid from a source thereof into thermal communication with the condenser, and a valve to regulate the flow of liquid through the conduit and having an open position allowing the liquid to flow through the conduit. The apparatus further comprises an electronic control for use with a source of an electronic signal, including an electronic switch having an open state in which the electronic signal does not pass through the switch, a closed state in which the electronic signal passes through the switch, and a trigger wherein, when an electronic signal having a predetermined magnitude passes to the trigger, the switch changes from the open state to the closed state. The electronic control also includes electronically actuated means positioned in series with the electronic switch for moving the valve to the open position, and a temperature responsive resistance element in thermal communication with a refrigerant passing through the condenser and positioned in series with the trigger of the electronic switch for varying the magnitude of the electronic signal passing to the trigger in response to the temperature of the refrigerant passing through the condenser wherein the electronic switch changes from the open state to the closed state when the temperature of the refrigerant passing through the condenser reaches a predetermined magnitude.

DETAILED DESCRIPTION OF THE PREFERRED EMBODIMENT

Figure 1:
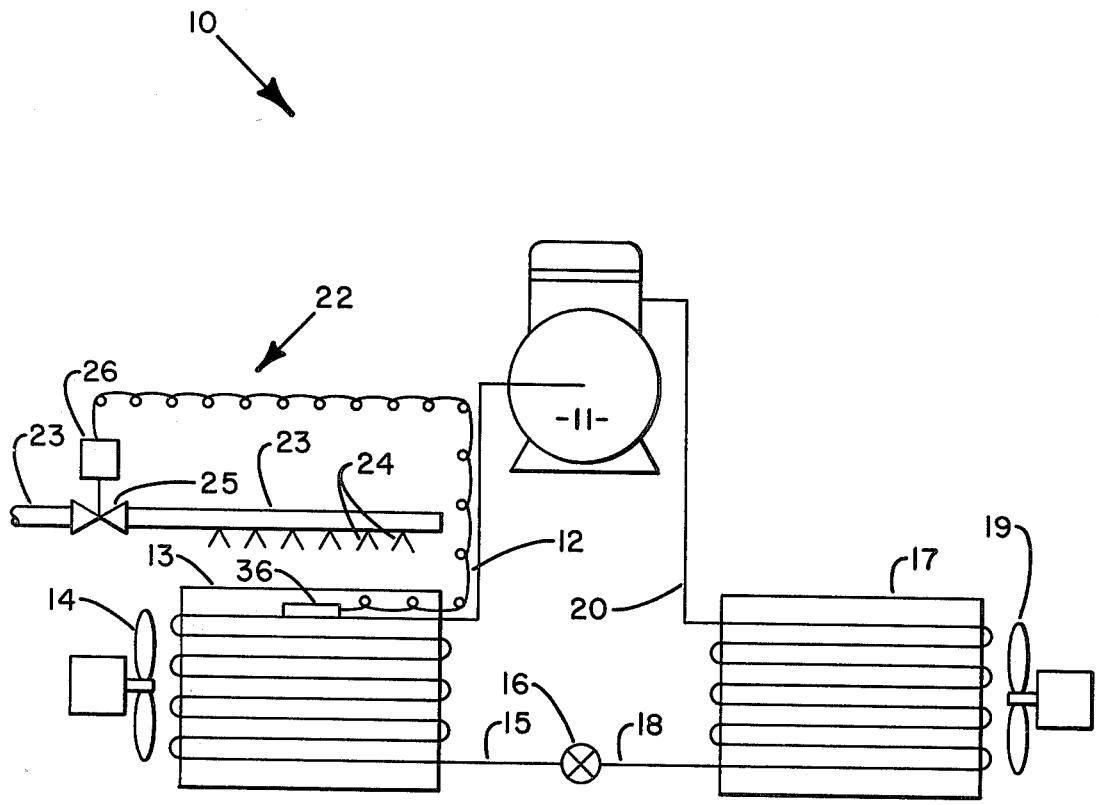
FIG. 1 is a schematic representation of a refrigeration unit employing the present invention.

Referring to FIG. 1, a mechanical refrigeration unit 10 is diagrammatically illustrated in which the present invention is employed. Refrigeration unit 10 includes a refrigerant compressor 11 which compresses a refrigerant and discharges it through conduit 12 to condenser 13. Condenser 13 may be comprised of a plurality of tubes or coils, and ambient air is passed over the surfaces of the condenser in a heat transfer relation with the vaporous refrigerant passing therethrough. The refrigerant rejects heat to the ambient air and is condensed thereby. Suitable means, for example fan 14, is provided to route the ambient air over the surfaces of condenser 13. From condenser 13, the condensed refrigerant passes through conduit 15 to expansion means 16. Although as a thermal expansion valve, expansion means 16 may be any one of may typical expansion means, for example a capillary tube, employed in refrigeration units. The refrigerant expands in expansion means 16, and then passes to evaporator 17 through conduit 18. Evaporator 17 may be comprised of a plurality of tubes or coils; and a medium to be cooled, for example the air of an enclosure, may be passed over the surfaces of the evaporator in a heat transfer relationship with the refrigerant passing therethrough. Suitable means, for example fan 19, is provided to route the medium to be cooled over the surfaces of evaporator 17. The refrigerant absorbs heat from the medium to be cooled and is vaporized thereby. The vaporized refrigerant is pulled back through conduit 20 into compressor 11 to complete the usual mechanical refrigeration cycle. The refrigeration unit described above is representative of a type utilized in window mounted room air conditioners or similar air conditioning units.

Normally, the ambient air flowing through condenser 13 absorbs a satisfactory amount of heat from the refrigerant passing therethrough. However, as discussed previously, it may happen that as a result of a variety of different circumstances the ambient air directed over condenser 13 cannot maintain the refrigerant within a desirable temperature range. In order to assist the air in extracting heat from the condenser 13 and the refrigerant flowing therethrough, a cooling liquid such as water may be sprayed over the condenser by means of a spray system 22. Spray system 22 includes a conduit 23 for passing the cooling liquid from a source thereof (not shown) into thermal communication with condenser 13. Conduit 23 includes a plurality of discharge nozzles 24, which are located above condenser 13. Water is sprayed over condenser 13 through nozzles 24 in the form of a mist. The water is vaporized as it contacts the hot surfaces of condenser 13, absorbing considerable heat from the condenser and the refrigerant flowing therethrough. The size of conduit 23 and the size and distribution of discharge nozzles 24 will be determined by the characteristics of the particular air cooled unit. Thus, for example, depending upon the particular tonnage or location of the air cooled unit, a water spray system of a given magnitude may be used.

The water spray is not constantly needed, and a valve 25 is located in conduit 23 to regulate the flow of liquid through the conduit and nozzles 24. Preferably, valve 25 has an open position allowing water to flow through conduit 23 and a closed position preventing water from flowing through the conduit. Valve 25 is biased to the closed position by any suitable means such as a spring (not shown) and is moved to the open position by activation of an electronically actuated means such as a solenoid 26. By controlling activation of solenoid 26, spray system 22 can be employed only when needed, minimizing the consumption of water and reducing the operating costs of the spray system.

Figure 2:
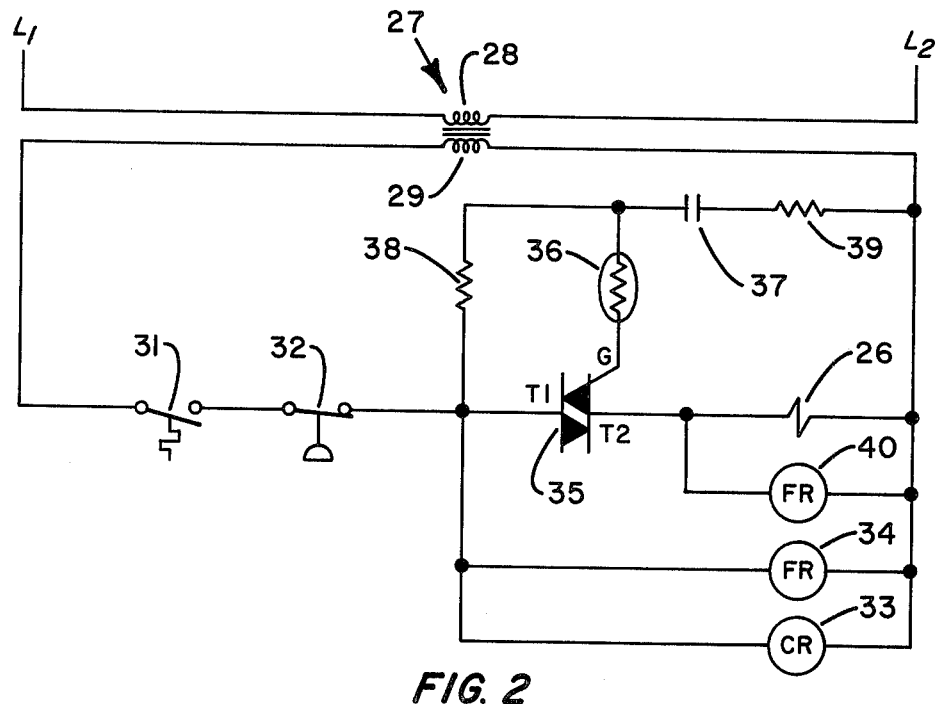
FIG. 2 is a schematic representation of the electronic control circuit of the water spray system of the refrigeration unit shown in FIG. 1.

In accordance with the present invention, an electronic control circuit, depicted schematically in FIG. 2, is provided to control solenoid 26 and valve 25 is response to the temperatures of refrigerant flowing through condenser 13. The circuit shown in FIG. 2 is for use with a source of an electronic signal, preferably one which provides an alternating current having a peak voltage magnitude of approximately 230 volts and a commutating frequency of about 60 cycles per second. A source of an electronic signal of this type is commonly available and is represented in FIG. 2 by lines L1 and L2. A transformer 27 having a primary winding 28 and a secondary winding 29 is employed to provide a stepped-down voltage of approximately 24 volts.

The electronic control circuit illustrated in FIG. 2 includes a thermostat switch 31, responsive to the temperature of the area being served by the refrigeration unit 10, and a normally closed switch 32. Switch 32 is a safety device, specifically a low pressure cutout switch. Other safety devices such as a high pressure cutout switch and a compressor motor overload switch are known in the art and may also be used. A compressor motor relay switch 33 and an evaporator fan relay switch 34 are located in series with switches 31 and 32. Relay switches 33 and 34 are connected in any manner well known in the art to the electric control circuits (not shown) for the motors of, respectively, compressor 11 and evaporator fan 19. When switches 31 and 32 are closed, compressor 11 is activated, initiating operation of refrigeration unit 10, and fan 19 in activated, forcing ambient air over evaporator 17. The electronic circuit of FIG. 2 further includes solenoid 26 for moving valve 25 to the open position, and and electronic switch such as a triac 35 having main terminals T1 and T2 and a gate or trigger terminal G.

Triac 35 is an electronic element having an open or off state and a closed or on state. In the absence of any applied voltages, triac 35 assumes its open condition in which a very high impedance exists between its main terminals T1 and T2 to effectively constitute an open switch. When a voltage of either polarity is impressed across the main terminals, triac 35 will remain non-conductive until a gate or triggering current of appropriate magnitude is translated between the gate terminal G and the main terminal T1 in either direction, whereupon the triac changes to the closed state and permits current flow between terminals T1 and T2 in response to the voltage applied thereto and in the direction determined by the voltage's polarity. Once triac 35 is rendered conductive, a very low impedance is presented between its main terminals so that it essentially functions as a closed switch. Thus, triac 35 comprises an electronic switch having an open state in which the electronic signal does not pass through the switch, a closed state in which the electronic signal passes through the switch, and a trigger G wherein, when an electronic signal having a predetermined magnitude passes to the trigger, the switch changes from the open state to the closed state. Once rendered conductive, conduction through triac 35 will continue even after the termination of the gate current so long as there is a potential difference across the main terminals. However, if the potential difference across main terminals T1 and T2 has a zero magnitude and, at the same time, the gate current is below a certain magnitude, referred to as the maintaining magnitude and which is less than the triggering magnitude, then triac 35 returns to its open or off state. Thereafter, when the voltage across the main terminals is increased from zero, conduction will not occur until a triggering current again flows between gate G and terminal T1.

Triac 35 is positioned so that main terminals T1 and T2 are in series with solenoid 26 and gate terminal G is in parallel with the solenoid. Thus, when triac 35 switches to the closed or on state, current flows through the triac to solenoid 26, activating the solenoid. This moves valve 25 to the open position, which allows water to flow through conduit 23 and nozzles 24. The water is sprayed over the exterior surfaces of condenser 13, absorbing heat from the condenser and the refrigerant flowing therethrough. On the other hand, when triac 35 is in the open state, current does not pass through the triac, solenoid 26 is inactive, and the valve 25 remains in the closed position. Water is not sprayed over condenser 11, conserving water and reducing the operating costs of spray system 22 and refrigeration unit 10.

A temperature responsive resistance element, preferably an NTC thermistor 36, in thermal communication with the refrigerant passing through condenser 13 is positioned in series with trigger G of electronic switch 35 for varying the magnitude of the electronic signal passing to the trigger in response to the temperature of the refrigerant passing through the condenser. As is well known to those skilled in the art, an NTC thermistor has the characteristic that its resistance decreases as a function of its temperature. With this arrangement, the peak voltage magnitude of the current passing through element 36 and to the gate or trigger terminal G of triac 35 increases as the temperature of the refrigerant passing through condenser 13 increases.

Since the electronic control circuit illustrated in FIG. 2 is for use with an alternating current, triac 35 would, without a capacitor 37, switch to the open state each time the alternating current had a zero voltage magnitude. This would result because, regardless of the resistance of resistor 36, when the alternating current has a zero voltage magnitude, the voltage across terminals T1 and T2 of triac 35 is zero and, in the absence of capacitor 37, the current impressed across terminals G and T1 of the triac would also be zero, at which time the triac would return to its open state. It is desired that triac 35 switch between the open and closed states in response to the temperature of the refrigerant flowing through the condenser, not in response to the normal fluctuations in the electronic signal used with the circuit. Use of capacitor 37, as illustrated in FIG. 2, accomplishes this desired result. Capacitor 37 is positioned in series with terminals G and T1; and, as is well known in the art, the capacitor causes a phase shift in the current passing therethrough. Thus, there is a phase difference between the gate current and the source of the alternating current. This phase difference allows the gate current to be greater than the maintaining magnitude when the source of the alternating current, and hence the current impressed across the terminals T1 and T2, has a zero voltage magnitude, preventing triac 35 from switching to the open state in response to the zero voltage of the current source. The electronic control circuit also includes current limiting resistors 38 and 39 to prevent the current which passes through triac 35 and capacitor 37 from reaching a magnitude which might damage these electronic elements.

With the electronic control of the present invention, as the temperature of refrigerant flowing through condenser 13 increases, the resistance of resistor 36 decreases. When this resistance reaches a sufficiently low value, the current impressed across terminals G and T1 of triac 35 reaches the triggering value and the triac switches to the closed state. That is, triac 35 changes from the open state to the closed state when the temperature of the refrigerant passing through the condenser 13 reaches a predetermined magnitude, determined by the operating characteristics of the triac and resistance element 36. When triac 35 switches to the closed state, solenoid 26 is activated, valve 25 is opened, and water is sprayed over the surfaces of condenser 13. Hence, it can be seen that the electronic control of the present invention is a very simple control for a water spray system, incorporating the inherent advantages such as reliability, accuracy, and durability which solid state electronic elements have over mechanical elements. Moreover, the electronic control is very simple to construct and install, and does not require any complex mechanical cooperation between its components.

Often, with a refrigeration unit 10 of the type discussed herein, fan 19 associated with evaporator 17 has at least two operating speeds, a low speed and a high speed. The electronic control circuit illustrated in FIG. 2 include electronically actuated means such as a relay 40 located in series with main terminals T1 and T2 of triac 35 to switch fan 19 from low speed to high speed. When triac 35 is in the closed state, current flows through the main terminals T1 and T2 of the triac to relay 40, closing the relay. Relay 40, as will be apparent to one skilled in the art, may be associated in any suitable manner with the electric control circuit (not shown) for fan 19 so that the closing of the relay switches the fan from low speed to high speed, increasing the flow of air over evaporator 17. In this way, once an increased refrigeration load is felt by means of sensing an increased temperature in the refrigerant flowing through condenser 13, the rate of flow of ambient air over the evaporator 17 is increased, assisting the refrigeration unit 10 to respond to the increased load.

While it is apparent that the invention herein disclosed is well calculated to fulfill the objects above stated, it will be appreciated that numerous modifications and embodiments may be devised by those skilled in the art, and it is intended that the appended claims over all such modifications and embodiments that fall within the true spirit and scope of the present invention.

What is claimed is:

1. Apparatus for supplying a cooling fluid to a condenser of a refrigeration unit comprising:
   a conduit for passing the cooling fluid from a source thereof into heat transfer relation with the condenser;
   a valve to regulate the flow of fluid through the conduit and having an open position allowing fluid flow therethrough; and
   an electronic control for use with a source of an alternating electric current, and including
   a triac having an open state for preventing the current from passing therethrough, a closed state for conducting the current through the triac, and a trigger wherein, when a current having a predetermined magnitude passes thereto, the triac changes from the open state to the closed state,
   electrically actuated means positioned in series with the triac for moving the valve to the open position, and
   a temperature responsive resistance element in heat transfer relation with a refrigerant passing through the condenser and positioned in series with the trigger of the triac for varying the magnitude of the current passing to the trigger in response to the temperature of the refrigerant passing through the condenser for changing the triac from the open state to the closed state when the temperature of the refrigerant passing through the condenser reaches a predetermined magnitude, and
   means for shifting the phase of the current passing to the trigger of the triac.

2. Apparatus for supplying a cooling fluid to a condenser of a refrigeration unit, the refrigeration unit including an evaporator and a fan having a low operating speed and a high operating speed for forcing ambient air over the evaporator, the apparatus comprising:
   a conduit for passing the cooling fluid from a source thereof into heat transfer relation with the condenser;
   a valve to regulate the flow of fluid through the conduit and having an open position allowing fluid flow therethrough; and
   an electronic control for use with a source of an electric signal, including
   an electronic switch having an open state for preventing the electric signal from passing therethrough, a closed state for conducting the electric signal through the switch, and a trigger wherein, when an electric signal having a predetermined magnitude passes thereto, the switch changes from the open state to the closed state,
   first electrically actuated means positioned in series with the electronic switch for moving the valve to the open position,
   second electrically actuated means positioned in series with the electronic switch for changing the fan from the low speed to the high speed, and
   a temperature responsive resistance element in heat transfer relation with a refrigerant passing through the condenser and positioned in series with the trigger of the electronic switch for varying the magnitude of the electric signal passing to the trigger in response to the temperature of the refrigerant passing through the condenser for changing the electronic switch from the open state to the closed state when the temperature of the refrigerant passing through the condenser reaches a predetermined magnitude.

3. The apparatus of claim 2 wherein the electric signal is an alternating current and the electronic control further includes means for shifting the phase of the current passing to the trigger of the electronic switch.

4. In a refrigeration unit having a compressor, a condenser, an evaporator, and expansion means connected in a closed fluid circuit, a refrigerant for passage through the closed fluid circuit, a fan having a low operating speed and a high operating speed for forcing ambient air over the evaporator, a conduit for passing a cooling fluid from a source thereof into heat transfer relation with the condenser, and a valve to regulate the flow of fluid through the conduit and having an open position allowing fluid flow therethrough, the improvement comprising:
   an electronic control for use with a source of an alternating electric current, and including
   an electronic switch having an open state for preventing the current from passing therethrough, a closed state for conducting the current through the switch, and a trigger wherein, when an electric signal having a predetermined magnitude passes thereto, the switch changes from the open state to the closed state,
   an electrically actuated solenoid positioned in series with the electronic switch for moving the valve to the open position,
   an NTC thermistor in heat transfer relation with the refrigerant passing through the condenser and positioned in series with the trigger of the electronic switch for varying the magnitude of the electric signal passing to the trigger in response to the temperature of the refrigerant passing through the condenser for changing the electronic switch from the open state to the closed state when the temperature of the refrigerant passing through the condenser reaches a predetermined magnitude,
   an electrically actuated relay positioned in series with the electronic switch for changing the fan from the low speed to the high speed, and
   a capacitor located in series with the trigger of the electronic switch for shifting the phase of the electric signal passing thereto.

* * * * *